United States Patent
Pachauri

(12) United States Patent (10) Patent No.: US 9,892,324 B1
Pachauri (45) Date of Patent: Feb. 13, 2018

(54) ACTOR/PERSON CENTRIC AUTO THUMBNAIL

(71) Applicant: VUCLIP (SINGAPORE) PTE. LTD., Singapore (SG)

(72) Inventor: Kulbhushan Pachauri, Bangalore (IN)

(73) Assignee: PCCW VUCLIP (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 15/656,417

(22) Filed: Jul. 21, 2017

(51) Int. Cl.
G06K 9/00 (2006.01)
G06K 9/66 (2006.01)
G06K 9/62 (2006.01)

(52) U.S. Cl.
CPC ..... *G06K 9/00751* (2013.01); *G06K 9/00288* (2013.01); *G06K 9/622* (2013.01); *G06K 9/66* (2013.01)

(58) Field of Classification Search
CPC ........... G06K 9/00751; G06K 9/00288; G06K 9/622; G06K 9/66; G06K 9/00295; G06F 17/30793
See application file for complete search history.

(56) References Cited

U.S. PATENT DOCUMENTS

2013/0070975 A1* 3/2013 Begeja .............. G06F 17/30793
382/118

OTHER PUBLICATIONS

Sengee et al: "Brightness preserving weight clustering histogram equalization", IEEE, 2008.*

* cited by examiner

*Primary Examiner* — Ruiping Li
(74) *Attorney, Agent, or Firm* — Zhichong Gu; Wong & Rees LLP

(57) ABSTRACT

Approaches, techniques, and mechanisms are disclosed for generating thumbnails. According to one embodiment, a subset of images each depicting character face(s) is identified from a collection of images. An unsupervised learning method is applied to automatically cluster the subset of images into image clusters. Top image clusters are selected from the image clusters based at least in part on weighted scores of images clustered within the image clusters. Thumbnail(s) are generated from images in the top image clusters.

20 Claims, 6 Drawing Sheets

400

ACTOR/PERSON CENTRIC AUTO THUMBNAIL

TECHNICAL FIELD

Embodiments relate generally to media content, and, more specifically, to techniques for generating actor/person centric thumbnails for media content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Content distributors offer access to a variety of media content items, ranging anywhere from user-uploaded media clips to high-quality, subscription-level television shows and movies. Many media content items may be long in playing time. To help consumers find interesting media content items to access, thumbnails of the media content items may be provided for consumers to preview or browse media content items.

Under some approaches, thumbnails may be generated through interactive image annotation processes that rely on relatively intensive manual input from content creators or curators. However, these approaches can be time consuming, error prone and inconsistent, especially where thumbnails need to be generated for numerous media content items from a wide variety of content sources or content providers.

Under some other approaches, representative images may be selected through automatic processes that rely on objective image quality. While the automatic processes may find images with good objective image quality from media content, such images oftentimes still deviate significantly from what content creators or curators would select to represent the media content. As a result, thumbnails generated under these approaches may be of little real interest to media content consumers, but rather may serve to suppress the consumers' interests in accessing the media content.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
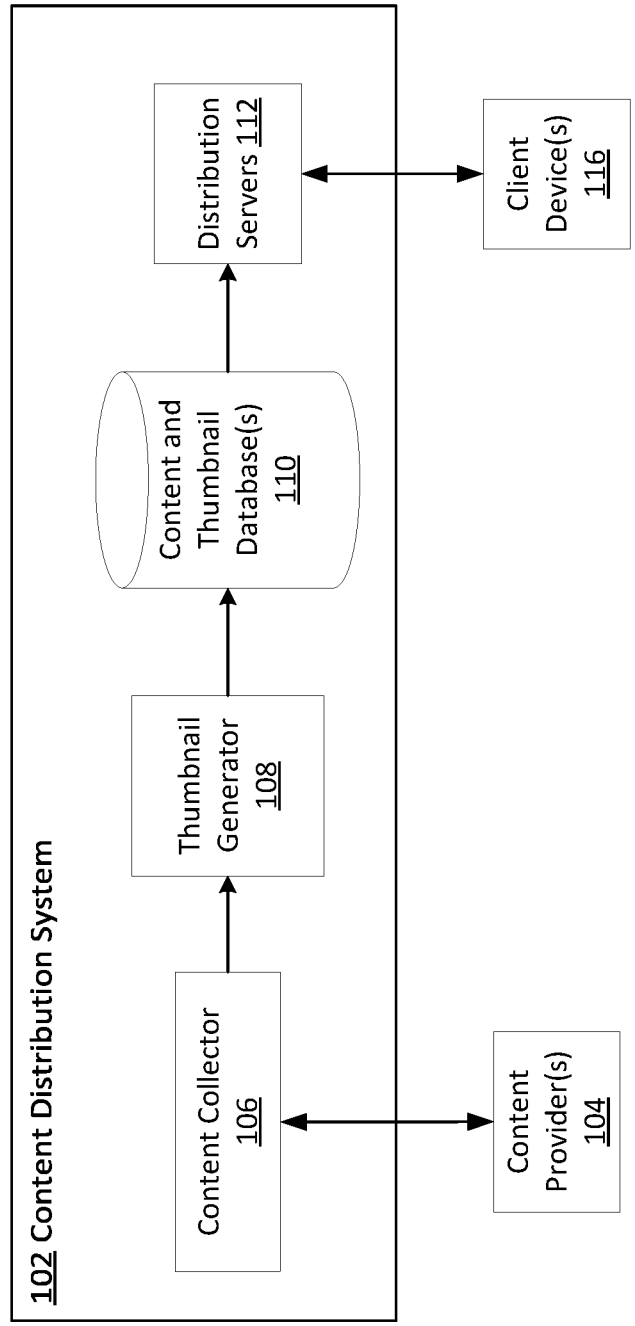
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Content Provider
2.2. Content Collection
2.3. Thumbnail Generation
2.4. Content and Thumbnail Storage
2.5. Content Distribution
2.6. Thumbnail Processing
2.7. Key Image Selection
2.8. Auto Clustering
2.9. Thumbnail Creation
2.10. Thumbnail Post Processing
2.11. Miscellaneous
3.0. Functional Overview
3.1. Generating Thumbnail(s) for a Media Content Item
3.2. Generating and Rendering Thumbnail(s) from Images
3.3. Variations
3.4. Weighted Scoring
4.0. Example Embodiments
5.0. Implementation Mechanism—Hardware Overview
6.0. Extensions and Alternatives

1.0. General Overview

Techniques as described herein can be used to automatically generate person/character centric thumbnails for media content items with little or no manual input. These techniques identify key images from a collection of images, where the key images depict interesting visual objects such as character faces, human faces, and so forth. As used herein, the term "faces" may broadly refer to poses, emotions, and so forth. The key images can be identified relatively efficiently based on skin tone detection, edge detection algorithms, object segmentation algorithms, neural network based methods, and so forth. Additionally, optionally or alternatively, some or all of non-image information such as audio content, metadata, and so forth, may be analyzed to determine whether the key images are likely to contain character faces.

Before selecting the best key images with the best image qualities from the key images for thumbnail generation, the key images are first automatically clustered into image clusters, for example using a clustering method based on a type of unsupervised learning. Furthermore, an optimal total image cluster number may be selected or estimated for the image clusters using cluster evaluation techniques such as silhouette scoring, gap statistics, and so forth, which minimize cluster variance, minimize intra-cluster distance and/or maximize inter-cluster distance. The clustering of key images under techniques as described herein allows key images containing the same character face to be automatically clustered into a corresponding image cluster. As a result, key images containing different character faces are automatically clustered into their respective image clusters.

To select the best image cluster(s) and the best image(s) for thumbnail generation, individual weighted scores may be computed for the key images in the image clusters. Cluster-level weighted scores for the image clusters can be derived based on group values (e.g., statistical group values, etc.) derived from the individual weighted scores for the key images. Based on the cluster-level weighted scores, respective importance levels of the image clusters that contain different character faces can be assessed. One or more top image clusters depicting one or more top characters or persons in the media content item may be selected from the image clusters with the optimal total image cluster number based on the cluster-level weighted scores.

One or more (e.g., attractive, person/character centric, etc.) thumbnails may then be generated from one or more images in the one or more top image clusters of the media content item. The one or more images can be selected based on their individual image-level weighted score that is computed based on a number of weight factors such as intra cluster distances, quality metrics, and so forth. Each of the one or more thumbnails may be a single thumbnail image, a short video clip, and so forth, that depicts one or more main characters. Additionally, optionally or alternatively, thumbnail post processing operations may be performed on the one or more thumbnails as a part of generating one or more (e.g., final, attractive, culturally proper, etc.) person/character centric thumbnails.

Approaches, techniques, and mechanisms are disclosed for generating thumbnails for media content items. According to one embodiment, a subset of images each depicting one or more character faces is identified from a collection of images. Unsupervised learning is applied to automatically cluster the subset of images into a plurality of image clusters. One or more top image clusters are selected from the plurality of image clusters based at least in part on weighted scores of images clustered within the plurality of image clusters. One or more thumbnails generated from one or more images in the one or more top image clusters are caused to be rendered on a display device to a viewer.

According to an embodiment, a sequence of images in an input video signal is received. A subset of images each depicting one or more character faces is detected in the sequence of images. One or more auto clustering algorithms are applied to the subset of images to generate a plurality of image clusters. A cluster distance is determined for each image in each image cluster in the plurality of image clusters. A quality metric is determined for each image in each image cluster in the plurality of image clusters. A weighted score is assigned to each image in each image cluster in the plurality of image clusters, based on an individual cluster distance for each such image and an individual quality metric for each such image. Based on an individual weighted score for each image in each image cluster in the plurality of image clusters, a subset of image clusters is selected from the plurality of image clusters. Thumbnail images generated from one or more images in the subset of image clusters are caused to be rendered on a display device to a viewer.

In other aspects, the invention encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 comprises one or more computing devices. The one or more computing devices comprise any combination of hardware and software configured to implement the various logical components described herein, including components such as content distribution system 102 and content provider(s) 104. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Content Provider

System 100 comprises a content distribution system 102, one or more content provider(s) 104 for the purpose of providing source media content items to content distribution system 102, and optionally one or more other systems including but not limited to one or more client devices 116 used to consume media content items offered for access by content distribution system 102. In various embodiments, there may be a single content providers or multiple content providers interfacing with content distribution system 102 to provide the source media content items to content distribution system 102 for generating the media content items to be accessed by a multitude of client devices such as client devices 116.

Examples of content provider(s) may include, but are not necessarily limited to only, any of: cloud-based media content provider servers, premise-based media content provider servers, professional studio systems, computing devices operated by individual users (e.g., self-media producers, end users, consumers, amateurs, etc.) who upload source media content items for sharing with other individual users such as those operating client devices 116, etc. As used herein, the term "media content item" may refer to a content item comprising one or more of: audio only data, video only data, audiovisual data, any of the foregoing with other multimedia data or information (e.g., still images, close caption, webpages, presentation slides, etc.).

The source media content items can be collected by a content collector 106 of content distribution system 102 in any combination of a wide variety of different methods. For example, none, some, or all of the source media content items may be collected through content feeds implemented by web sites or application interfaces (e.g., RSS, XML, JSON, etc.) that respond to requests for specific source media content items by streaming or otherwise sending the specific source media content items from content provider(s) 104 to content distribution system 102. In some embodiments, some of the source media content items can be uploaded to content distribution system 102 wirelessly and/ or with wired connection from a multitude of end-user computing devices such as PCs, laptops, tablet computers, mobile devices, wearable devices, etc.

2.2. Content Collection

Content distribution system 102 is coupled to content provider(s) 104 via one or more networks, such as the Internet. Via these one or more networks, content collector 106 of content distribution system 102 may support a variety of standards through which content partners or providers may provide content, such as feed-based formats, document files, transfer protocols, or third-party transfer services. Depending on the embodiment, content collector 106 may be configured to continuously scan for and detect new source media content items for content distribution system 102 to distribute, and/or allow for content providers to explicitly instruct the content distribution system 102 to distribute new media content items.

In an embodiment, content collector 106 may be configured to host one or more content provider portals by which content provider(s) 104 may provide source media content items to content distribution system 102. For instance, a content provider as described herein may upload source media content item via a web page or File Transfer Protocol (FTP)-based server of such a content provider portal. In some embodiments, a content provider as described herein may identify specific locations from which content collector 106 may download source media content items.

In an embodiment, content collector 106 may be configured to receive content item components in a variety of formats. The components may be received as, for example, video and/or audio files or streams in any supported format, including without limitation formats such as MPEG, MP4, MKV, WMV, FLV, MP3, WebM, HTML5, DASH, ASTC 3.0, and so forth. There may be different video and/or audio components for different purposes, such as a versions having different resolutions or other video formatting characteristics, versions with or without commercials, teasers, expanded or alternate versions, alternate language tracks, and so forth. The components may also include subtitle files in various languages and formats (e.g. SRT or WebVTT), manually authored/curated thumbnail image files or archives, metadata files in formats such as Excel spreadsheets or XML documents, and so forth.

2.3. Thumbnail Generation

In an embodiment, content distribution system 102 includes a thumbnail generator 108 to generate individual thumbnails for some or all of the source media content items collected by content collector 106. Thumbnail generator 108 may be configured, for instance, to ensure that each media content item offered for access to client devices 116 has at least one thumbnail. The thumbnail may be, but is not necessarily limited to only, related to or derived from one of: a selected image from the media content item, a selected image from a source media content from which the media content item offered for access is generated, a thumbnail image generated from the selected image from the media content item offered for access or from the corresponding source media content item, a short video clip (e.g., 5 second video clip, etc.) from the media content item, a short video clip from a source media content from which the media content item offered for access is generated, a spatially and/or temporally downsampled video clip generated from the short video clip from the media content item offered for access or from the corresponding source media content item, etc.

In some embodiments, a single media content item or multiple media content items that are to be offered access by content distribution system 102 may be generated from the same source media content item. In some embodiments, the multiple media content items derived from the same source media content item may represent multiple versions such as original and derivative versions. In some embodiments, the multiple media content items generated from the same source media content item may correspond respectively to multiple client device types, multiple operating systems, multiple communication service providers, multiple geographic regions (e.g., continents, countries, provinces, cities, areas, etc.), multiple content consumer demographics (e.g., males, females, young people, adults, children, sports loving, news junkies, etc.), multiple content distribution channels, and so forth. Any of the multiple media content items may have its respective aspect ratio, its respective video resolution, its respective minimum or maximum video bit rate, its respective minimum or maximum duration, its respective video coding format and/or profile, its respective audio mix, its respective audio channel configuration, its respective audio sampling rate, and so forth. Any of the multiple media content items may have its respective thumbnail.

In cases where multiple media content items are generated from the same source media content item, multiple thumbnails may be respectively generated for the multiple media content items. These thumbnails may have their respective aspect ratios, their respective video resolutions, their respective minimum or maximum video bit rates, their respective minimum or maximum durations, their respective video coding formats and/or profiles, their respective audio mixes, their respective audio channel configurations, their respective audio sampling rates, and so forth.

2.4. Content and Thumbnail Storage

Some or all of media content items and thumbnails as described herein may be stored in one or more content and thumbnail database(s) 110. These media content items and thumbnails can be made available for access by one or more distribution servers 112. In some embodiments, content and thumbnail database(s) 110 may be implemented as a single database. In some embodiments, content and thumbnail database(s) 110 may be implemented as multiple databases.

2.5. Content Distribution

Distribution servers 112 represent one or more content distribution processes to provide access the media content items made available by content distribution systems 102. The content distribution processes may operate to provide access to the media content items, to client devices 116 with web browsers or mobile applications, as a part of web sites, web servers, application servers, backend servers, and so forth. For instance, a web server may generate a navigable hierarchy or other collection of web pages by which thumbnails of the media content items are rendered/displayed. The thumbnails may be selectable by client devices 116 for accessing the media content items represented by the thumbnails.

2.6. Thumbnail Processing

Figure 2:
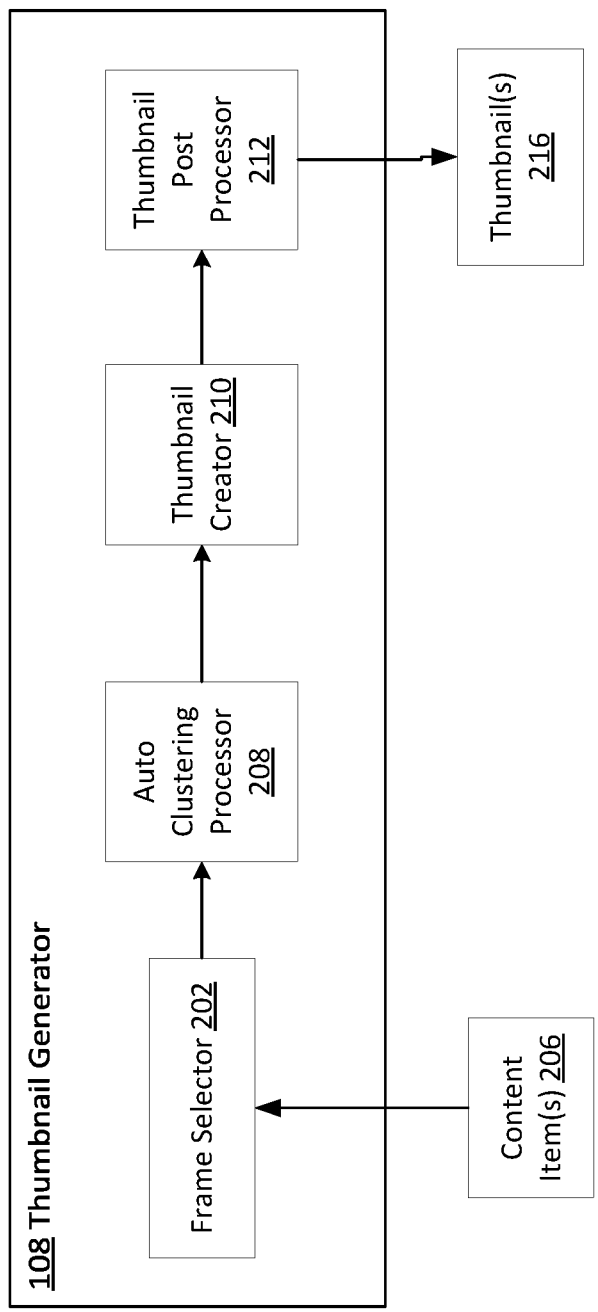
FIG. 2 is an illustrative view of various aspects of an example thumbnail generator.

FIG. 2 is an illustrative view of various aspects of an example thumbnail generator 108 in which the techniques described herein may be practiced, according to an embodiment. Thumbnail generator may be implemented by one or more computing devices. These one or more computing devices comprise any combination of hardware and software configured to implement the various logical components described herein, including components such as image selector 202, auto clustering processor 208, thumbnail creator 210 and thumbnail post processor 212. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.7. Key Image Selection

To generate thumbnails 216 for one or more media content items 206, thumbnail generator 108 may include an image selector 202 that selects key images (or shots) from media content items 206. A media content item as described herein may, but is not necessarily limited to only, comprise a series of images (or images) covering a playback time duration. Image selector 202 may perform any combination of various levels of image analysis on some or all individual images (or images) in a media content item. Image selector 202 can be configured to select specific key images from a specific media content item in media content items 206, for example based on a combination in wide varieties of selection factors and/or selection methods. The specific key images constitute a subset of images consisting of a specific total key image number, a specific key image percentage, a specific key image ratio, etc., among all input image images in the specific media content item. In some embodiments, numbers of key images may be the same for two or more media content items as described herein. In some embodiments, numbers of key images may be different for two or more media content items as described herein.

In an embodiment, image selector 202 analyzes luminance (or luma) values and/or chrominance (or chroma) values in some or all images in the specific media content item. Image selector 202 can determine luminance values and/or chrominance values of some or all pixels in an image, calculate distributions of these luminance values and/or chrominance values in the image using luma and/or chroma histograms or other statistical means, and determine whether the image is likely to contain (e.g., human, etc.) faces or facial features. For instance, based on luma and/or chroma distributions of the image, image selector 202 may detect whether the image contains a relatively large number/percentage of skin tone pixels above a specific user or system configured skin tone pixel number/percentage threshold, or above a specific machine learned skin tone pixel number threshold. If that is the case, image selector 202 may identify the image as a key image (or shot).

Additionally, optionally or alternatively, image selector 202 may analyze edges, visual objects, etc., in some or all images in the specific media content item. Image selector 202 may apply any combination of wide varieties of edge detection algorithms, object recognition and segmentation algorithms, image morphological operations, and so forth, to identify edges, visual objects, a percentage area of total image occupied by an object of interest, etc., as depicted by some or all pixels in an image, to determine temporal and/or spatial changes (e.g., movements, shape changes, etc.) in the identified edges, visual objects, etc., in consecutive or a set of consecutive images including the image, and determine whether the image is likely to contain (e.g., human, etc.) faces or facial features. For instance, a face resembling object/shape that moves from image to image may cause an image in which the face resembling object/shape is present to be identified as a key image (or shot).

Additionally, optionally or alternatively, image selector 202 may analyze non-visual information (e.g., audio information, metadata, etc.) in connection with some or all images in the specific media content item. For instance, image selector 202 may determine whether accompanying audio that is to be played in synchronization with a (e.g., relatively short, a 5-second, a 1-second, etc) sequence of images including an image contains human voice (e.g., dialog, speeches, singing, etc.). If that is the case, image selector 202 may identify the image as a key image (or shot), alone or in combination with other factors determined in relation to the image.

In an embodiment, image selector 202 may combine various image analytical results and/or non-image analytical results to determine whether an image should be classified as a key image (or shot). For instance, luma and/or chroma distributions in the image may be just one input to a key image classifier implemented by image selector 202 to determine whether the image should be classified as a key image (or shot). Other inputs to the key image classifier may include, but are not necessarily limited to only, edges, any of: objects, temporal and/or spatial changes in edges, temporal and/or spatial changes in objects, accompanying audio such as human voices, and so forth. The key image classifier may be linear or nonlinear, may be weighted, equal-weighted or non-weighted, and so forth. Parameters such as weight factors may be dynamically or statically configured, and may be set based at least in part on machine learning.

In an embodiment, image selector 202 may implement relatively light weight machine learning techniques to classify images in a series of images (or images) into key images or non-key images relatively fast. Additionally, optionally, or alternatively, image selector 202 may implement relatively light weight regression models to assign (e.g., continuous, etc.) probabilistic values relatively fast to images in a series of images (or images). The probabilistic values may be used to rank or select a subset of images from all the (input) images as key images.

2.8. Auto Clustering

According to an embodiment, image selection data generated by image selector 202 is provided to an auto clustering processor 208 to generate image clusters. The image selection data identifies the subset of images in the series of images of the specific media content item to be the key images that contain faces or that have relatively high likelihood of containing faces.

In some embodiments, the image selection data includes geometric information such as edges to identify or delineate specific spatial regions in a key image as described herein as containing face(s). In some embodiments, each of the key images has only one specific spatial region that is identified to be containing a face. In some other embodiments, each of the key images has either a single specific spatial region that is identified to be containing a face or multiple specific spatial regions each of which is identified to be containing a face. For instance, in the case of two or more faces detected in the image, the system, or the auto-clustering processor therein, in some embodiments, may select a face with the maximum area, and cluster the image into a respective image cluster based on the face with the maximum area; or in some other embodiments may select both/all detected faces, compute the features of a respective area containing each of the detected faces, and cluster the image with the two or more faces into respective image clusters based on two or more faces detected from the image.

In an embodiment, auto clustering processor 208 extracts a set of features from a key image as described herein. Each feature in the set of features extracted from the key image represents an independent measurement of pixel values in specific spatial region(s) of the key image that are identified to be containing face(s). The set of features may include relatively low-level features such as local binary patterns (LBPs), Haar-like features, relatively high features such as deep neural network (DNN) features, convolutional neural network (CNN) features, and so forth.

Feature extraction may be performed on a color space like CIE Lab, CIE LUV, HSV and so forth with any combination in a wide variety of feature extraction techniques including but not limited to those performed with facial feature digital filters, face recognition deep neural networks, face recognition convolutional neural networks, and so forth. For instance, auto clustering processor 208 can apply LBP digital filtering on a spatial region identified to be containing a face to derive one or more LBP features (e.g., in CIE Lab color space, etc.). Additionally, optionally or alternatively, auto clustering processor 208 can use one or more DNNs including but not limited to one or more CNNs to derive one or more DNN features from a spatial region identified to be containing a face.

In some embodiments, at least some features in the set of features extracted from the key image may be generated or derived by one or more feature extraction techniques that are translation invariant, rotation invariant, scaling invariant, etc.

In an embodiment, auto clustering processor 208 spatially transforms a spatial region identified to be containing a face into an image block of specific sizes/dimensions (or a specific aspect ratio) such as a 64×64 pixel block, 96×96 pixel block, a 128×128 pixel block, a 256×256 pixel block, and so forth, based at least in part on a set of edges indicated by the image selection data to be delineating the spatial region. In transforming the spatial region into the image block of the specific sizes/dimensions, auto clustering processor 208 can perform one or more pixel-level or block-level image processing operations such as one or more of: translation, rotation, scaling, skew rectification, downsampling, upsampling, interpolation, sharpening, de-blurring, anti-aliasing, image/pixel morphological operations, and so forth.

In an embodiment, auto clustering processor 208 extracts one or more features in the set of features by way of applying digital filtering or neural network processing to pixel values in the image block of the specific sizes/dimensions to which the spatial region identified to be containing a face is transformed.

In an embodiment, the set of features extracted from the key image is represented by, or measured as, a feature vector that comprises a plurality of flow values (e.g., real or float flow values, etc.) in a plurality of (e.g., 24, 48, 64, 96, 128, 256, etc.) dimensions. In an embodiment, some or all flow values in the feature vector can be each normalized, for example by L1 Norm, L2 Norm, or Min and Max Norm, in a (normalized) value range between zero (0) and one (1), etc.

In an embodiment, based on individual sets of features extracted from the key images, auto clustering processor 208 automatically clusters the key images of the media content item into a plurality of image clusters each of which (e.g., mutually exclusively, etc.) comprises one or more respective key images among all the key images. Auto clustering processor 208 can select an optimal total number of image clusters for the plurality of image clusters using cluster evaluation techniques such as silhouette scoring, gap statistics, and so forth.

Auto clustering processor 208 may perform auto clustering of the key images into the plurality of image clusters using any combination in a wide variety of auto clustering techniques such as k-means clustering, distribution-based clustering, density-based clustering, and so forth. In an embodiment, one or more unsupervised artificial intelligence (AI) methods may be implemented by auto clustering processor 208 to perform auto clustering of the key images into the plurality of image clusters based on distributions of flow values of feature vectors that correspond to the individual sets of features extracted from the key images.

In an embodiment, for each key image in the key images, auto clustering processor 208 automatically clusters each such key image into a (e.g., single, etc.) specific image cluster among the plurality of image clusters.

2.9. Thumbnail Creation

According to an embodiment, the thumbnail generator 108 may comprise a thumbnail creator 210 to automatically create or generate one or more thumbnails for the media content item based on the key images of the media content item as automatically clustered into the plurality of image clusters.

In an embodiment, thumbnail creator 210 computes individual weighted scores for the key images in the plurality of image clusters. A weighted score for a key image in an image cluster in the plurality of image clusters may be computed based on a number of weight factors including but not limited to, one or more of: an intra-cluster distance of the key image to the center of the image cluster, image metrics such as light levels, colors, saturations, hues, a luminance dynamic range, ranges of color values or chrominance values, etc.

The intra-cluster distance of the key image to the center of the image cluster may be computed as a (e.g., Chebyshev, Euclidean, etc.) distance between a feature vector representing a set of features extracted from the key image and a cluster-level feature vector representing the center of the image cluster. The cluster-level feature vector may be computed as a non-weighted average, an equal-weighted average, a weighted average, etc. of feature vectors representing sets of features extracted from all key images in the image cluster.

The image metrics of the key image may be computed based at least in part on one or more image (or photographic) characteristics of the key image such as one or more of: luminance values (or light values), chrominance values, color values (e.g., RGB values, etc.), color saturations, skin tone pixels, spatial resolutions, a luminance dynamic range, and so forth. These image characteristics may be determined based on one or more of: pixel values of spatial region(s) of the key image identified to be containing face(s), pixel values of the entire key image, pixel values of a salient part of the key image where the salient part may contain image details other than or in addition to face(s), etc.

In some embodiments, pixel values of the key image may be represented in an input color space such as an RGB color space. In some embodiments, pixel values in the input color space are transformed (e.g., by a color space conversion matrix, by a color space conversion mapping, etc.) to pixel values in an intermediate color space (e.g., CIE Lab, CIE LUV, HSV, etc.) in which at least some of the image metrics (e.g., light levels, light level histograms, color saturation values, color hue values, etc.) can be relatively readily determined.

In an embodiment, an offensive material detection algorithm is performed by thumbnail creator 210 to determine whether a key image comprises offensive image details that are likely to turn off consumer interests to access the media content item. The offensive image details may include, but are not necessarily limited to only, image details depicting blood. For instance, a blood detection algorithm may be used by thumbnail creator 210 to detect whether the key image comprises any image details depicting a relatively large amount of blood. Additionally, optionally or alternatively, the blood detection algorithm may determine whether the number/percentage of pixels depicting blood in the key image is significant, for example whether the number/percentage of pixels exceeds a blood pixel number/percentage threshold. A box detection algorithm may be used by thumbnail creator 210 to detect whether the key image comprises any box such as a black box border. The box detection algorithm may determine whether the size of the box in the key image is significant in terms of visibility to a viewer.

In response to determining that the key image comprises offensive image details that are significant in terms of visual impact, thumbnail creator 210 may remove or otherwise prevent the key image from further thumbnail processing. Additionally, optionally or alternatively, thumbnail creator 210 may lower the weighted score for the key image. For instance, the weighted score may comprise a negative factor or a negative term to reduce the numeric value of the weighted score in respond to determining that the key image comprises offensive image details.

In an embodiment, thumbnail creator 210 selects a single best key image from all the key images of the media content item based on individual weighted scores computed for all the key images, and creates a thumbnail for the media content item based on the single best key image. Additionally, optionally or alternatively, the system, or thumbnail creator 210 therein, may personalize thumbnail creation by applying user preference (not the curator, the content provider or the content distributor) of end users. For example, the system may maintain user preferences of a specific user who watches frequently videos of a particular character. If multiple characters are present in a video (e.g., the sequence of images, etc.) for which a thumbnail is to be created, the system may use the user (personal) preferences to determine that the particular character among the multiple characters is preferred by the specific user. In response to such a determination, the system may proceed to create a personalized thumbnail by increasing the weight factor of key images or image clusters containing the face of the particular character, resulting in a relatively high probability that the particular character appears or is highlighted in the thumbnail. To match the character face with a detected face in a key image, the same facial features of the particular character (e.g., indicated in or derived directly or indirectly from the user preferences, etc.) can be used by the system.

In some embodiments, the single best key image is selected as the key image with the highest weighted score among all the key images, regardless of into which image cluster the single best key image is clustered.

In some embodiments, the single best key image is selected as the key image with the highest weighted score from a top image cluster in the plurality of image clusters. Individual cluster-level weighted scores may be computed (e.g., as a weighted or unweighted average, as a weighted or unweighted aggregate, etc.) for all the image clusters in the plurality of image clusters. Based on the individual cluster-level weighted scores, the image cluster that has the highest cluster-level weighted score is selected as the top image cluster. The key image that has the highest weighted score in the top image cluster is then identified as the single best key image.

In an embodiment, thumbnail creator 210 selects multiple best key images from all the key images of the media content item based on individual weighted scores computed for all the key images, and creates multiple thumbnails for the media content item based on the multiple best key images.

In some embodiments, the multiple best key images are selected as the key images with the highest weighted scores among all the key images, regardless of into which image cluster(s) the multiple best key images are clustered.

In some embodiments, the multiple best key images are selected as the key images with the highest weighted score from a single top image cluster in the plurality of image clusters. The image cluster that has the highest cluster-level weighted score is selected as the single top image cluster. The multiple key images that have the highest weighted scores in the single top image cluster are then identified as the multiple best key images.

In some embodiments, the multiple best key images are selected as the key images with the highest weighted score from multiple top image clusters in the plurality of image clusters. The image clusters that have the highest cluster-level weighted scores are selected as the multiple top image clusters. The multiple key images that have the highest weighted scores in the multiple top image clusters are then identified as the multiple best key images, regardless of into which the multiple top image clusters the multiple best key images are clustered. Additionally, optionally or alternatively, the multiple best key images comprise one or more key images with the highest weighted score(s) in each of the multiple top image clusters.

In an embodiment, thumbnail creator 210 automatically creates or generates one or more thumbnails 216 for the media content item, based on the best key image(s) as identified from the media content item.

A thumbnail as described herein may be, but is not necessarily limited to only, one of: one of the best key image(s) or a salient part thereof, a thumbnail image generated from one of the best key image(s) or a salient part thereof, a short video clip (e.g., 5 second video clip, etc.) of adjacent images including one of the best key image(s) or a salient part thereof from the media content item, a short video clip (e.g., 5 second video clip, etc.) generated from adjacent images including one of the best key image(s) or a salient part thereof from the media content item, a spatially and/or temporally downsampled video clip generated from one of the foregoing short video clip, etc.

Multiple thumbnails may be generated from one or more best key images or salient parts thereof. The multiple thumbnails may correspond respectively to multiple versions of the same media content item. For instance, each of the multiple thumbnails may correspond to a specific version of the media content item for a specific combination of one or more of: client device type(s), operating system(s), communication service provider(s), geographic region(s), content consumer demographic category, content distribution channel(s), and so forth. Any of the multiple thumbnails may have its respective aspect ratio, its respective video resolution, its respective minimum or maximum video bit rate, its respective minimum or maximum duration, its respective video coding format and/or profile, its respective audio mix, its respective audio channel configuration, its respective audio sampling rate, and so forth.

2.10. Thumbnail Post Processing

According to an embodiment, the thumbnail generator 108 may comprise a thumbnail post processor 212 to perform image processing operations on the one or more thumbnails 216 generated from the media content item. For instance, image sharpening operations may be performed on a thumbnail as described herein to remove blurs, boxes such as image borders, burned-in close-caption text, and so forth. For instance, boxing detection and removal may be performed to remove black bars around an image, and followed by aspect ratio correction using smart cropping that preserves the main character/object of the image. Additionally, optionally or alternatively, logo detection and removal may be performed to remove any CP logos present. Other image processing operations such as skin tone correction, downsampling, upsampling, white balancing, interpolation, etc., may be performed as a part of generating a thumbnail as described herein with a relatively high image quality.

2.11. Miscellaneous

System 100 illustrates only one of many possible arrangements of components configured to provide the functionality described herein. Other arrangements may include fewer, additional, or different components, and the division of work between the components may vary depending on the arrangement. For instance, thumbnail generation techniques as described herein may be practiced in other types of systems that are not necessarily content distribution systems to generate thumbnails for media content items.

3.0. Functional Overview

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Generating Thumbnail(S) for a Media Content Item

Figure 3:
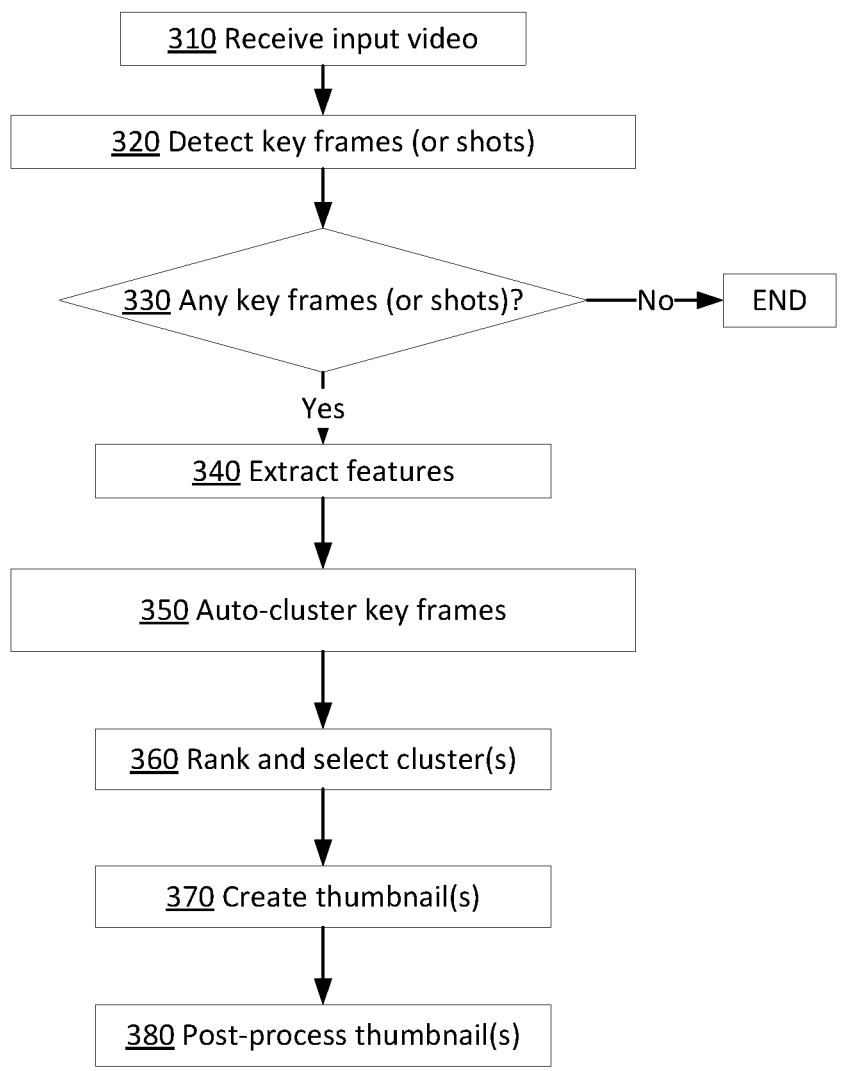
FIG. 3 illustrates an example flow for generating thumbnail(s) for a media content item.

FIG. 3 illustrates an example flow 300 for generating thumbnail(s) for a media content item, according to an embodiment. The various elements of flow 300 may be performed in a variety of systems, including a thumbnail generator (e.g., 108 of FIG. 1 and FIG. 2, etc.) in a system 100 such as described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 300 illustrates but one example flow for generating thumbnail(s) for a media content item. Other flows may involve additional or fewer steps, in potentially varying arrangements.

Block 310 comprises receiving a media content item such as an input video comprising a series of images (or images). The input video may be received in a media bitstream from one or more media streaming servers, as a video file from a remote or local storage, as a document downloaded from another computing system over one or more computer networks, and so forth. The input video may comprise one or more of: audio only data, video only data, audiovisual data, any of the foregoing with other multimedia data or information (e.g., still images, close caption, webpages, presentation slides, etc.).

Block 320 comprises detecting key images (or shots) in the series of images in the input video. Image content and/or audio content of each image in some or all images in the series may be analyzed. Various image analytical results and/or non-image analytical results can be used to determine whether an image (or image) should be classified as a key image (or shot). Image selection data may be generated to indicate whether a given image in the series of images in the input video is a key image, for example with a high confidence score to be containing a face (or character). The image selection data may also indicate geometric information to identify specific spatial region(s) in a key image that contain face(s) (or character(s)).

Block 330 comprises filtering out any non-key images from the series of images in the input video and outputting only detected key images to subsequent processing blocks based on the image selection data. If no key images are detected, then flow 300 ends and the system performing flow 300 may notify the curation team that no key images are detected. Otherwise, the detected key images may be passed to the subsequent processing blocks with the geometric information that identifies specific spatial regions in the key images that contain faces (or characters).

Block 340 comprises extracting a set of features from each of the key images. The set of features may include low-level or high-level facial features (e.g., LBP features, Haar-like features, DNN features, etc.) extracted from pixel values in spatial region(s) in the key image that have been identified by the image selection data as containing face(s) (or character(s)). The set of features may be represented by a multi-dimensional feature vector comprising a plurality of flow values (e.g., real or float flow values, etc.) some or all of which may be normalized.

Block 350 comprises extracting automatically clustering the key images in the series into a plurality of image clusters based on individual sets of features extracted from the key image. In an embodiment, features vectors representing the individual sets of extracted features are processed by a clustering algorithm based on unsupervised learning. An optimal total number of image clusters may be determined for the plurality of image clusters based on cluster evaluation techniques such as silhouette scoring, gap statistics, and so forth. In some embodiments, each image cluster in some or all of the image clusters may comprise key images that correspond to a face of a single specific person or a single specific character, as depicted in the series of images. In some embodiments, each image cluster in some or all of the image clusters may comprise key images that correspond to faces of a specific combination of two or more specific persons or two or more specific characters, as depicted in the series of images.

Block 360 comprises ranking and selecting (e.g., from the plurality of image clusters, etc.) image cluster(s) and/or key image(s) in the image clusters. Weighted scores may be computed or assigned to a key image on the basis of one or more weight factors such as an intra-cluster distance of the key image to the center of an image cluster to which the key image belongs, image metrics such as light levels, colors, saturations, hues, a luminance dynamic range, ranges of color values or chrominance values, presence or absence of any of one or more offensive image detail types, etc. The selection of image cluster(s) and/or key image(s) in the image clusters may be based on individual cluster-level weighted scores and/or individual image-level weighted scores.

Block 370 comprises creating a single thumbnail or multiple thumbnails for the selected key image(s). The thumbnail(s) created for the selected key image(s) may depict main character(s) or main person(s) appearing in the media content item, and may be used to represent the media content item. For instance, a media content consumer can browse through thumbnails generated from various media content items using techniques as described herein, and select specific media content items for access based at least in part on these thumbnails.

Block 380 comprises post processing the thumbnail(s). The selected key image(s) may comprise boxes, blurs, and so forth. Box detection operations and box removal operations may be applied to remove boxes from the thumbnail(s). Image sharpening operations may be applied to reduce or remove the blurs. Other image processing operations may also be applied to generate visually pleasing look(s) of the thumbnail(s).

3.2. Generating and Rendering Thumbnail(S) from Images

Figure 4:
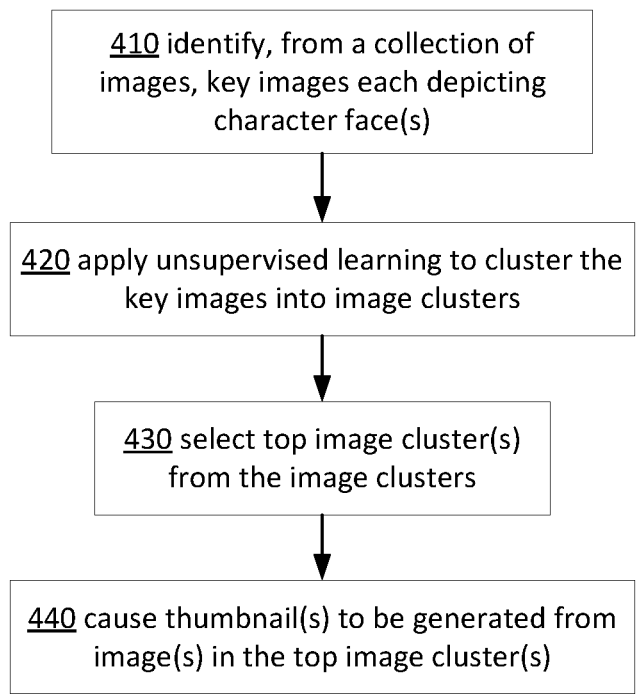
FIG. 4 illustrates an example flow 400 for generating and rendering thumbnail(s) from images.

FIG. 4 illustrates an example flow 400 for generating and rendering thumbnail(s) from images, according to an embodiment. The various elements of flow 400 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 400 illustrates but one example flow for generating and rendering thumbnail(s) from images. Other flows may involve additional or fewer steps, in potentially varying arrangements.

Block 410 comprises identifying, from a collection of images, a subset of images each depicting one or more character faces. The collection of images may be derived from any combination in a wide variety of image sources in any combination in wide varieties of image formats, spatial resolutions, dynamic ranges, color gamuts, white points, and so forth. For instance, the collection of images may be decoded from a media bitstream, a media file, and so forth. In an example, the collection of images may represent a set of video images to be rendered on a video display with a specific image refresh rate. In another example, the collection of images may represent a set of still images, for example captured from one or more events, scenes, trips, and so forth. The subset of images represents key images that contain character faces among the collection of images that may or may not contain character faces. One or more of image content analysis methods/algorithms, face detection methods/algorithms, human voice detection methods/algorithms, and so forth, can be used to identify the key images that contain character faces. For instance, DNN- or CNN-based image analyses may be performed on the collection of images to detect/determine whether any of the images contains a character face. A classifier or a regression model can be used to classify or identify a key image that is likely to contain at least one character face, for example above a specific confidence level or a specific probability threshold.

Block 420 comprises applying unsupervised learning to automatically cluster the subset of images (or the key images) into a plurality of image clusters. The clustering of the key images may be based on feature vectors comprising features extracted from each of the key images in a multitude of dimensions. Each of the dimensions in which a feature vector is represented may correspond to a specific extracted feature type or a specific type of measurement, observation, or filtering of pixel values in spatial region(s) of a key image that contain character face(s).

Block 430 comprises selecting one or more top image clusters from the plurality of image clusters based at least in part on weighted scores of images clustered within the plurality of image clusters. Weighted scores as described herein may be set to scale positively or increase/increment with weight factors in relation to visually pleasing look, culturally appropriate image content, amount of image details (e.g., spatial activity, etc.), high spatial resolution, high dynamic range, high color saturation, vividness (e.g., luminance and chrominance values matching natural skin tone values, etc.), and so forth. Additionally, optionally or alternatively, the weighted scores may be set to scale negatively or decrease/decrement with weight factors in relation to visually ugly/offensive look, culturally inappropriate image content, bloody scenes/background, low photographic qualities (e.g., dark image, blurry images, etc.), low spatial resolution, low dynamic range, low color saturation, off color, (e.g., luminance and chrominance values mismatching natural skin tone values, etc.), and so forth. The weighted scores may or may not be normalized.

Block 440 comprises causing one or more thumbnails generated from one or more images in the one or more top image clusters to be rendered on a display device to a viewer.

3.3. Variations

While flows 400 and 500 describe flows in which it is assumed that thumbnail generation will be performed, in other embodiments, the flows may include more or fewer steps as described.

3.4. Weighted Scoring

Figure 5:
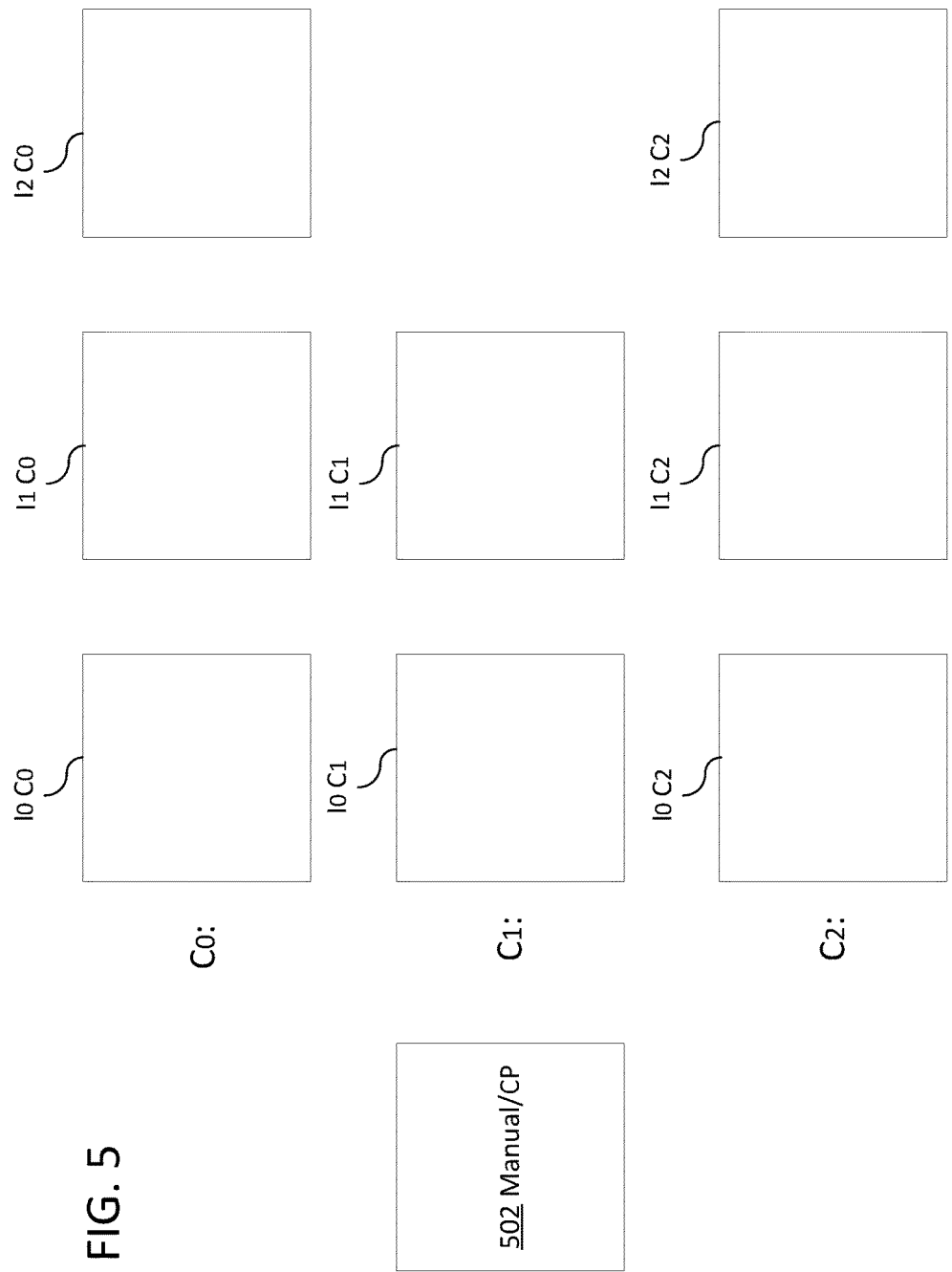
FIG. 5 illustrates an example of image clusters comprising key images from which the best key image(s) can be selected for thumbnail generation.

FIG. 5 illustrates an example of image clusters comprising key images from which the best key image(s) can be selected for thumbnail generation, according to an embodiment. FIG. 5 illustrates but one example of image clusters comprising key images from which the best key image(s) can be selected for thumbnail generation. In various embodiments, different image clusters and/or different number of key images in the image clusters may be used for selecting the best key image(s) for thumbnail generation.

In an embodiment, key images identified to be containing character faces may be clustered into a plurality of image clusters such as m clusters, where m is a positive integer. The m clusters may be respectively denoted as $C_0, C_1, \ldots, C_m$.

While three image clusters are depicted in FIG. 5, in various embodiments, the number of image clusters may be fewer or more than three. Additionally, optionally or alternatively, the number of image clusters may correspond to an optimal total image cluster number as determined or estimated based at least in part on cluster evaluation techniques such as silhouette scoring, gap statistics, and so forth.

Each of the m image clusters comprises one or more cluster samples that are respectively one or more key images that have been clustered into each such cluster. For example, cluster $C_0$ may comprise n key images as cluster samples, where n is a positive integer. The n key images in cluster $C_0$ may be denoted as $I_0C_0, I_1C_0, I_2C_0, I_3C_0 \ldots I_nC_0$.

As illustrated in FIG. 5, cluster $C_0$ may comprise three key images. Cluster $C_1$ may comprise two key images. Cluster $C_2$ may comprise three key images. It should be noted that, in various embodiments, an image cluster may comprise fewer or more cluster samples than those depicted in FIG. 5. For instance, a main character in a media content item is expected or likely to be depicted in a significant number of images of the media content item and thus in a corresponding image cluster generated from key images identified from the media content item.

In an embodiment, a quality metric denoted as $QI_iC_j$ is computed for each cluster sample in the m image clusters, where i is an index value between 0 and (m−1), j is an index value between 0 and (n−1). For instance, a quality metric for sample $I_0C_0$ belonging to clusters $C_0$ may be denoted as $QI_0C_0$. A quality metric for a key image can be computed based on any combination in a variety of image metrics in relation to the key image. The image metrics of the key image may be computed based at least in part on one or more image (or photographic) characteristics of the key image such as one or more of: luminance values (or light values), chrominance values, color values (e.g., RGB values, etc.), color saturations, skin tone pixels, spatial resolutions, a luminance dynamic range, presence or absence of offensive materials, presence or absence of culturally pleasing materials, and so forth. These image characteristics may be determined based on one or more of: pixel values of spatial region(s) of the key image identified to be containing face(s), pixel values of the entire key image, pixel values of a salient part of the key image where the salient part may contain image details other than or in addition to face(s), etc.

In an embodiment, an intra cluster distance denoted as $II_iC_j$ is computed for each cluster sample in the m image clusters, where i is an index value between 0 and (m−1), j is an index value between 0 and (n−1). For instance, an intra cluster distance for sample $I_0C_0$ belonging to clusters $C_0$ may be denoted as $II_0C_0$. In some embodiments, an intra cluster distance for a key image can be computed based on one or more feature vectors that have been used to cluster the key images into the m image clusters. For example, a feature vector may be represented in a feature space. A center of an image cluster in the feature space may be computed as a group value (e.g., average, mean, weighted, unweighted, etc.) of feature vectors of key images in the image cluster. An intra cluster distance for a key image in the image cluster may be, but is not necessarily limited to only, calculated as a Euclidean or Chebyshev distance between a feature vector comprising flow values extracted from the key image and the center of the image cluster computed with the features vectors of the key images that make up the image cluster.

In an embodiment, a weighted score denoted as $WI_iC_j$ is computed for each cluster sample in the m image clusters, where i is an index value between 0 and (m−1), j is an index value between 0 and (n−1). For instance, a weighted score for sample $I_0C_0$ belonging to clusters $C_0$ may be denoted as $WI_0C_0$. In some embodiments, a weighted score for a key image can be computed based on a quality metric, an intra cluster distance, and optionally other weight factors (e.g., presence or absence of bloody scene/background, etc.). For instance, a weighted score for sample $I_0C_0$ belonging to clusters $C_0$ can be computed as follows:

$$WI_0C_0 = ((II_0C_0)^\alpha + (QI_0C_0)^\beta)^\gamma$$

where $\alpha$, $\beta$ and $\gamma$ are parameters whose values can be statically or dynamically configured, tuned, or trained with training data. Additionally, optionally or alternatively, the values of these parameters can be content dependent, within numeric ranges from one (1) to two (2).

It should be noted that, in other embodiments, a weighted score as described herein can be calculated based on different expressions, different terms, different factors, a different functional form, different parameters, and so forth. For example, instead of or in addition to using exponential or power parameters, linear or non-linear factors other than exponential or power parameters. For instance, a weighted score may be computed with a functional expression f( . . . ) where f can be log, max, min, etc., depending on specific implementation examples.

In some embodiments, a reference thumbnail 502 may be manually inputted or automatically detected from content provider (CP) metadata accompanying a collection of images from which key images and thumbnail(s) derived from the key images are to be generated. In some embodiments, the goal of thumbnail generation may be to obtain an automatically generated thumbnail with little or no human intervention that is close to or that matches reference thumbnail 502. In some embodiments, reference thumbnails such as 502 received by or otherwise accessible to a thumbnail generator as described herein may be used by machine learning algorithms as labeled responses to optimize one or more of: face detection methods/algorithms, clustering methods/algorithms, weights, coefficients, factors, scores, metrics, parameters, functional forms, and so forth, that are involved in thumbnail generation as described herein.

4.0. Example Embodiments

Examples of some embodiments are represented, without limitation, in the following paragraphs:

According to an embodiment, a method comprises: identifying, from a collection of images, a subset of images each depicting one or more character faces; applying unsupervised learning to automatically cluster the subset of images into a plurality of image clusters; selecting one or more top image clusters from the plurality of image clusters based at least in part on weighted scores of images clustered within the plurality of image clusters; causing one or more thumbnails generated from one or more images in the one or more top image clusters to be rendered on a display device to a viewer.

In an embodiment, the collection of images represents one or more of: a series of video images, a plurality of still photographic images, a plurality of computer-rendered images, a combination of video images and still photographic images, and so forth.

In an embodiment, the collection of images represents one or more of: a series of video images, a plurality of still photographic images, a plurality of computer-rendered images, a combination of video images and still photographic images, and so forth.

In an embodiment, the collection of images represents a media content item offered for access to at least one population of media content consumers, and at least one of the one or more thumbnails is selectable by a media content consumer to access the media content item.

In an embodiment, the subset of images is automatically clustered into the plurality of image clusters based on feature vectors comprising flow values in relation to low-level or high-level features extracted from the subset of images.

In an embodiment, the low-level or high-level features extracted from the subset of images comprise one or more of: local binary patterns (LBPs), deep neural network (DNN) features, convolutional neural network (CNN) features, Haar-like features, and so forth.

In an embodiment, the subset of images is identified from the collection of images based on a face detection method comprising one or more of: edge detection algorithms, object recognition and segmentation algorithms, image morphological operations, and so forth.

In an embodiment, the subset of images is identified from the collection of images based on one or more of: image content analyses, audio content analyses, analyzing metadata related to the collection of images, and so forth.

In an embodiment, the one or more thumbnails comprise at least an image of a specific aspect ratio.

According to an embodiment, a method for generating thumbnail images from video signals, comprises: receiving a sequence of images in an input video signal; detecting a subset of images each depicting one or more character faces in the sequence of images; applying one or more auto clustering algorithms to the subset of images to generate a plurality of image clusters; determining a cluster distance for each image in each image cluster in the plurality of image clusters; determining a quality metric for each image in each image cluster in the plurality of image clusters; assigning a weighted score to each image in each image cluster in the plurality of image clusters, based on an individual cluster distance for each such image and an individual quality metric for each such image; based on an individual weighted score for each image in each image cluster in the plurality of image clusters, selecting a subset of image clusters from the plurality of image clusters; causing thumbnail images generated from one or more images in the subset of image clusters to be rendered on a display device to a viewer.

According to an embodiment, a system comprises: a frame selector that identifies, from a collection of images, a subset of images each depicting one or more character faces; a clustering processor that applies unsupervised learning to automatically cluster the subset of images into a plurality of image clusters, and select one or more top image clusters from the plurality of image clusters based at least in part on weighted scores of images clustered within the plurality of image clusters; a thumbnail creator that generates one or more thumbnails from one or more images in the one or more top image clusters, wherein the one or more thumbnails are caused to be rendered on a display device to a viewer.

According to an embodiment, a system for generating thumbnail images from video signals comprises: a content collector that receives a sequence of images in an input video signal; a frame selector that detects a subset of images each depicting one or more character faces in the sequence of images; a clustering processor that applies one or more auto clustering algorithms to the subset of images to generate a plurality of image clusters; wherein a cluster distance is determined for each image in each image cluster in the plurality of image clusters; wherein a quality metric is determined for each image in each image cluster in the plurality of image clusters; wherein a weighted score is assigned to each image in each image cluster in the plurality of image clusters, based on an individual cluster distance for each such image and an individual quality metric for each such image; wherein a subset of image clusters is selected from the plurality of image clusters based on an individual weighted score for each image in each image cluster in the plurality of image clusters; a thumbnail creator that generates thumbnail images from one or more images in the subset of image clusters, wherein the thumbnail images are caused to be rendered on a display device to a viewer.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 6:
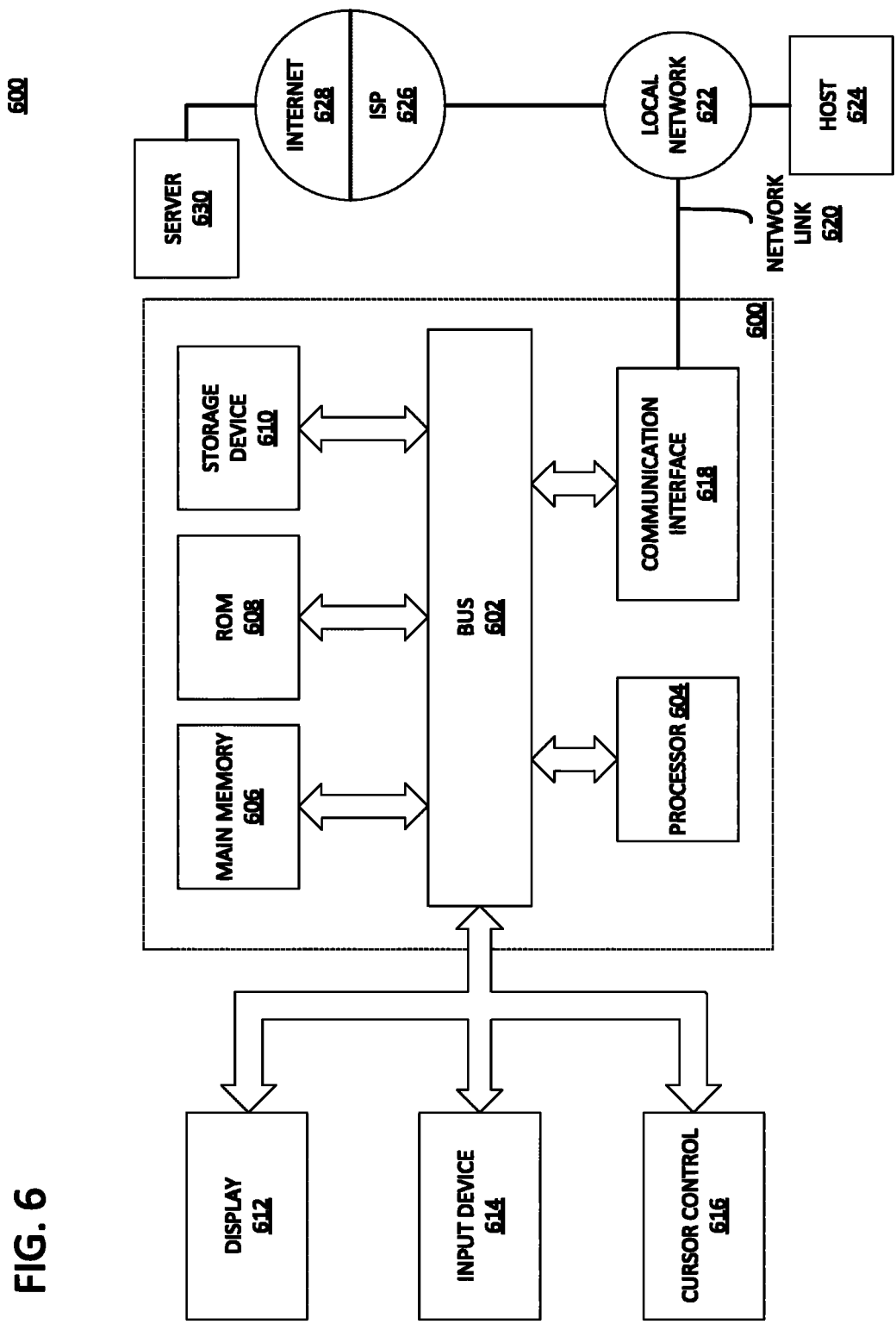
FIG. 6 is block diagram of a computer system upon which embodiments of the invention may be implemented.

FIG. 6 is a block diagram that illustrates a computer system 600 utilized in implementing the above-described techniques, according to an embodiment. Computer system 600 may be, for example, a desktop computing device, laptop computing device, tablet, smartphone, server appliance, computing main image, multimedia device, handheld device, networking apparatus, or any other suitable device.

Computer system 600 includes one or more busses 602 or other communication mechanism for communicating information, and one or more hardware processors 604 coupled with busses 602 for processing information. Hardware processors 604 may be, for example, a general purpose microprocessor. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes a main memory 606, such as a random access memory (RAM) or other dynamic or volatile storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, is provided and coupled to bus 602 for storing information and instructions.

Computer system 600 may be coupled via bus 602 to one or more displays 612 for presenting information to a computer user. For instance, computer system 600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

In an embodiment, output to display 612 may be accelerated by one or more graphics processing unit (GPUs) in computer system 600. A GPU may be, for example, a highly parallelized, multi-core floating point processing unit highly optimized to perform computing operations related to the display of graphics data, 3D data, and/or multimedia. In addition to computing image and/or video data directly for output to display 612, a GPU may also be used to render imagery or other video data off-screen, and read that data back into a program for off-screen image processing with very high performance. Various other computing tasks may be off-loaded from the processor 604 to the GPU.

One or more input devices 614 are coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

A computer system 600 may implement techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions. The instructions received by main memory 606 may optionally be stored on storage device 610 either before or after execution by processor 604.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as a 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send messages and receive data, including program code and/or other types of instructions, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

In an embodiment, some or all of the systems described herein may be or comprise server computer systems, including one or more computer systems 600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating thumbnail images from video signals, comprising:
   receiving a sequence of images in an input video signal;
   detecting a subset of images each depicting one or more character faces in the sequence of images;
   applying one or more auto clustering algorithms to the subset of images to generate a plurality of image clusters;
   determining a cluster distance for each image in each image cluster in the plurality of image clusters;
   determining a quality metric for each image in each image cluster in the plurality of image clusters;
   assigning a weighted score to each image in each image cluster in the plurality of image clusters, based on an individual cluster distance for each such image and an individual quality metric for each such image;
   based on an individual weighted score for each image in each image cluster in the plurality of image clusters, selecting a subset of image clusters from the plurality of image clusters;
   causing one or more thumbnail images generated from one or more images in the subset of image clusters to be rendered on a display device to a viewer.

2. The method of claim 1, wherein the sequence of images represents one or more of: a series of video images, a plurality of still photographic images, a plurality of computer-rendered images, or a combination of video images and still photographic images.

3. The method of claim 1, wherein the sequence of images represents a media content item offered for access to at least one population of media content consumers, and wherein at least one of the one or more thumbnail images is selectable by a media content consumer to access the media content item.

4. The method of claim 1, wherein the subset of images is automatically clustered into the plurality of image clusters based on feature vectors comprising flow values in relation to low-level or high-level features extracted from the subset of images.

5. The method of claim 4, wherein the low-level or high-level features extracted from the subset of images comprise one or more weighted combinations of: local binary patterns (LBPs), deep neural network (DNN) features, convolutional neural network (CNN) features, or Haar-like features.

6. The method of claim 1, wherein the subset of images is identified from the sequence of images based on a face detection method comprising one or more of: edge detection algorithms, object recognition and segmentation algorithms, or image morphological operations.

7. The method of claim 1, wherein the subset of images is identified from the sequence of images based on one or more of: image content analyses, audio content analyses, or analyzing metadata related to the sequence of images.

8. The method of claim 1, wherein the one or more thumbnail images-comprise at least an image of a specific aspect ratio.

9. A system for generating thumbnail images from video signals, comprising:
   one or more computing processors;
   a non-transitory computer readable medium that stores computer instructions which, when executed by the one or more computing processors, cause the one or more computing processors to perform the method of claim 1.

10. A system for generating thumbnail images from video signals, comprising:
    one or more computing processors;
    a non-transitory computer readable medium that stores computer instructions which, when executed by the one or more computing processors, cause the one or more computing processors to perform the method of claim 2.

11. A system for generating thumbnail images from video signals, comprising:
   one or more computing processors;
   a non-transitory computer readable medium that stores computer instructions which, when executed by the one or more computing processors, cause the one or more computing processors to perform the method of claim 3.

12. A system for generating thumbnail images from video signals, comprising:
   one or more computing processors;
   a non-transitory computer readable medium that stores computer instructions which, when executed by the one or more computing processors, cause the one or more computing processors to perform the method of claim 4.

13. A system for generating thumbnail images from video signals, comprising:
   one or more computing processors;
   a non-transitory computer readable medium that stores computer instructions which, when executed by the one or more computing processors, cause the one or more computing processors to perform the method of claim 5.

14. A system for generating thumbnail images from video signals, comprising:
   one or more computing processors;
   a non-transitory computer readable medium that stores computer instructions which, when executed by the one or more computing processors, cause the one or more computing processors to perform the method of claim 6.

15. A system for generating thumbnail images from video signals, comprising:
   one or more computing processors;
   a non-transitory computer readable medium that stores computer instructions which, when executed by the one or more computing processors, cause the one or more computing processors to perform the method of claim 7.

16. A system for generating thumbnail images from video signals, comprising:
   one or more computing processors;
   a non-transitory computer readable medium that stores computer instructions which, when executed by the one or more computing processors, cause the one or more computing processors to perform the method of claim 8.

17. A non-transitory computer readable medium that stores computer instructions which, when executed by one or more computing processors, cause the one or more computing processors to perform the method of claim 1.

18. A non-transitory computer readable medium that stores computer instructions which, when executed by one or more computing processors, cause the one or more computing processors to perform the method of claim 2.

19. A non-transitory computer readable medium that stores computer instructions which, when executed by one or more computing processors, cause the one or more computing processors to perform the method of claim 3.

20. A non-transitory computer readable medium that stores computer instructions which, when executed by one or more computing processors, cause the one or more computing processors to perform the method of claim 4.

\* \* \* \* \*